United States Patent
Feder et al.

(10) Patent No.: US 7,602,986 B1
(45) Date of Patent: Oct. 13, 2009

(54) APPARATUS AND METHOD FOR COMPRESSING BINARIZED IMAGES

(75) Inventors: Meir Feder, Maccabim (IL); Arik Gordon, Herzlia (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 08/817,549

(22) PCT Filed: Oct. 17, 1995

(86) PCT No.: PCT/US95/13296

§ 371 (c)(1),
(2), (4) Date: Oct. 14, 2003

(87) PCT Pub. No.: WO96/12245

PCT Pub. Date: Apr. 25, 1996

(30) Foreign Application Priority Data

Oct. 18, 1994 (IL) .................................... 111325

(51) Int. Cl.
*G06K 9/46* (2006.01)
(52) U.S. Cl. ..................... 382/245; 382/232

(58) Field of Classification Search ................. 382/245, 382/232, 233, 237, 247, 248, 173; 358/539, 358/538, 3.29
See application file for complete search history.

(56) References Cited

U.S. PATENT DOCUMENTS 5,844,718 A * 12/1998 Ohsawa et al. ............... 358/539

\* cited by examiner

*Primary Examiner*—Anh Hong Do
(74) *Attorney, Agent, or Firm*—Mark M. Friedman

(57) ABSTRACT

An apparatus and method for compressing binarized images (90) comprising receiving a binarized image (70) and generating a first sequence of first code symbols (80) representing the binarized image wherein at least one row of the image is represented in run-length encoded format and encoding a portion of the first sequence of code symbols using a preliminary encoding scheme, thereby to provide a first portion of a second sequence of code symbols, and, while encoding, accumulating the frequency of at least some of the first code symbols thus far encoded (100) and generating an additional portion of the second sequence using a modified version of the code scheme such that at least one subsequent code symbol in the first sequence with a large accumulated frequency is encoded more compactly in the second portion than at least one subsequent code symbol in the first sequence with a small accumulated frequency.

29 Claims, 2 Drawing Sheets

APPARATUS AND METHOD FOR COMPRESSING BINARIZED IMAGES

FIELD OF THE INVENTION

The present invention relates to methods for compressing binarized images, generally.

BACKGROUND OF THE INVENTION

Arithmetic coding is described in:

Witten, I. H et al, "Arithmetic coding for data compression", Computing Practices, Communications of the ACM, June 1987, Vol. 30(6); and "Arithmetic coding and statistical modeling", Dr. Dobb's Journal, February 1991, pp. 16-29.

The MR decoding scheme is described in CCITT Recommendation T.4 and T.6 for Groups 3 and 4.

A conventional binarizing technique is described in Foley, J. et al, *Computer Graphics: Principles and practice,* 2nd Ed., Section 13.1.2, pages 568-573.

The disclosures of all of the above publications are hereby incorporated by reference.

SUMMARY OF THE INVENTION

The present invention seeks to provide an improved image manipulation system.

There is thus provided in accordance with a preferred embodiment of the present invention a method for compressing binarized images including receiving a binarized image and generating a first sequence of first code symbols representing the binarized image wherein at least one row of the image is represented in run-length encoded format, and encoding a portion of the first sequence of code symbols using a preliminary encoding scheme, thereby to provide a first portion of a second sequence of code symbols, and, while encoding, accumulating the frequency of at least some of the first code symbols thus far encoded and generating an additional portion of the second sequence using a modified version of the code scheme such that at least one subsequent code symbol in the first sequence with a large accumulated frequency is encoded more compactly in the second portion than at least one subsequent code symbol in the first sequence with a small accumulated frequency.

Further in accordance with a preferred embodiment of the present invention, a modified Huffman coding scheme is employed to generate the first sequence of first code symbols.

In accordance with another preferred embodiment of the present invention, there is provided a method for compressing binarized images including receiving a binarized image and generating a first sequence of first code symbols representing the binarized image including a representation of one row of the binarized image and a representation of differences between at least one subsequent row and at least one previous row, and encoding a portion of the first sequence of code symbols using a preliminary encoding scheme, thereby to provide a first portion of a second sequence of code symbols, and, while encoding, accumulating the frequency of at least some of the first code symbols thus far encoded and generating an additional portion of the second sequence using a modified version of the code scheme such that at least one subsequent code symbols in the first sequence with a large accumulated frequency is encoded more compactly in the second portion than at least one subsequent code symbol in the first sequence with a small accumulated frequency.

Further in accordance with a preferred embodiment of the present invention, the encoding scheme used to encode the first sequence of code symbols is continually modified such that code symbols in the first sequence with a large accumulated frequency are encoded more compactly in the second portion than subsequent code symbols in the first sequence with a small accumulated frequency.

Still further in accordance with a preferred embodiment of the present invention, a modified-read coding scheme is employed to generate the first sequence of first code symbols.

Further in accordance with a preferred embodiment of the present invention, a modified modified-read coding scheme is employed to generate the first sequence of first code symbols.

Still further in accordance with a preferred embodiment of the present invention, the method also includes binarizing a discrete level image, thereby to provide the binarized image.

Additionally in accordance with a preferred embodiment of the present invention, the method also includes binarizing a continuous level image, thereby to provide the binarized image.

Still further in accordance with a preferred embodiment of the present invention, arithmetic coding is employed to translate the accumulated frequency of at least some of the first code symbols into second code symbols.

There is also provided, in accordance with a preferred embodiment of the present invention, apparatus for compressing binarized images including a run-length encoder operative to receive a binarized image and to generate a first sequence of first code symbols representing the binarized image wherein at least one row of the image is represented in run-length encoded format, and an adaptive encoder operative to encode a portion of the first sequence of code symbols using a preliminary encoding scheme, thereby to provide a first portion of a second sequence of code symbols, and, while encoding, to accumulate the frequency of at least some of the first code symbols thus far encoded and to generate an additional portion of the second sequence using a modified version of the code scheme such that at least one subsequent code symbol in the first sequence with a large accumulated frequency is encoded more compactly in the second portion than at least one subsequent code symbol in the first sequence with a small accumulated frequency.

There is further provided, in accordance with a preferred embodiment of the present invention, apparatus for compressing binarized images including a binarized image compressor operative to receive a binarized image and to generate a first sequence of first code symbols representing the binarized image, the first sequence including a representation of one row of the binarized image and a representation of differences between at least one subsequent row and at least one previous row, and an adaptive encoder operative to encode a portion of the first sequence of code symbols using a preliminary encoding scheme, thereby to provide a first portion of a second sequence of code symbols, and, while encoding, to accumulate the frequency of at least some of the first code symbols thus far encoded and to generate an additional portion of the second sequence using a modified version of the code scheme such that at least one subsequent code symbol in the first sequence with a large accumulated frequency is encoded more compactly in the second portion than at least one subsequent code symbol in the first sequence with a small accumulated frequency.

Further in accordance with a preferred embodiment of the present invention, the binarized image compressor employs a modified-read coding scheme to generate the first sequence of first code symbols.

Still further in accordance with a preferred embodiment of the present invention, the binarized image compressor employs a modified modified-read coding scheme to generate the first sequence of first code symbols.

Additionally in accordance with a preferred embodiment of the present invention, the adaptive encoder employs arithmetic coding to translate the accumulated frequency of at least some of the first code symbols into second code symbols.

Still further in accordance with a preferred embodiment of the present invention, the encoding scheme used to encode the first sequence of code symbols is continually modified such that code symbols in the first sequence with a large accumulated frequency are encoded more compactly in the second portion than subsequent code symbols in the first sequence with a small accumulated frequency.

BRIEF DESCRIPTION OF THE DRAWINGS

The present invention will be understood and appreciated from the following detailed description, taken in conjunction with the drawings in which.

Figure 1:
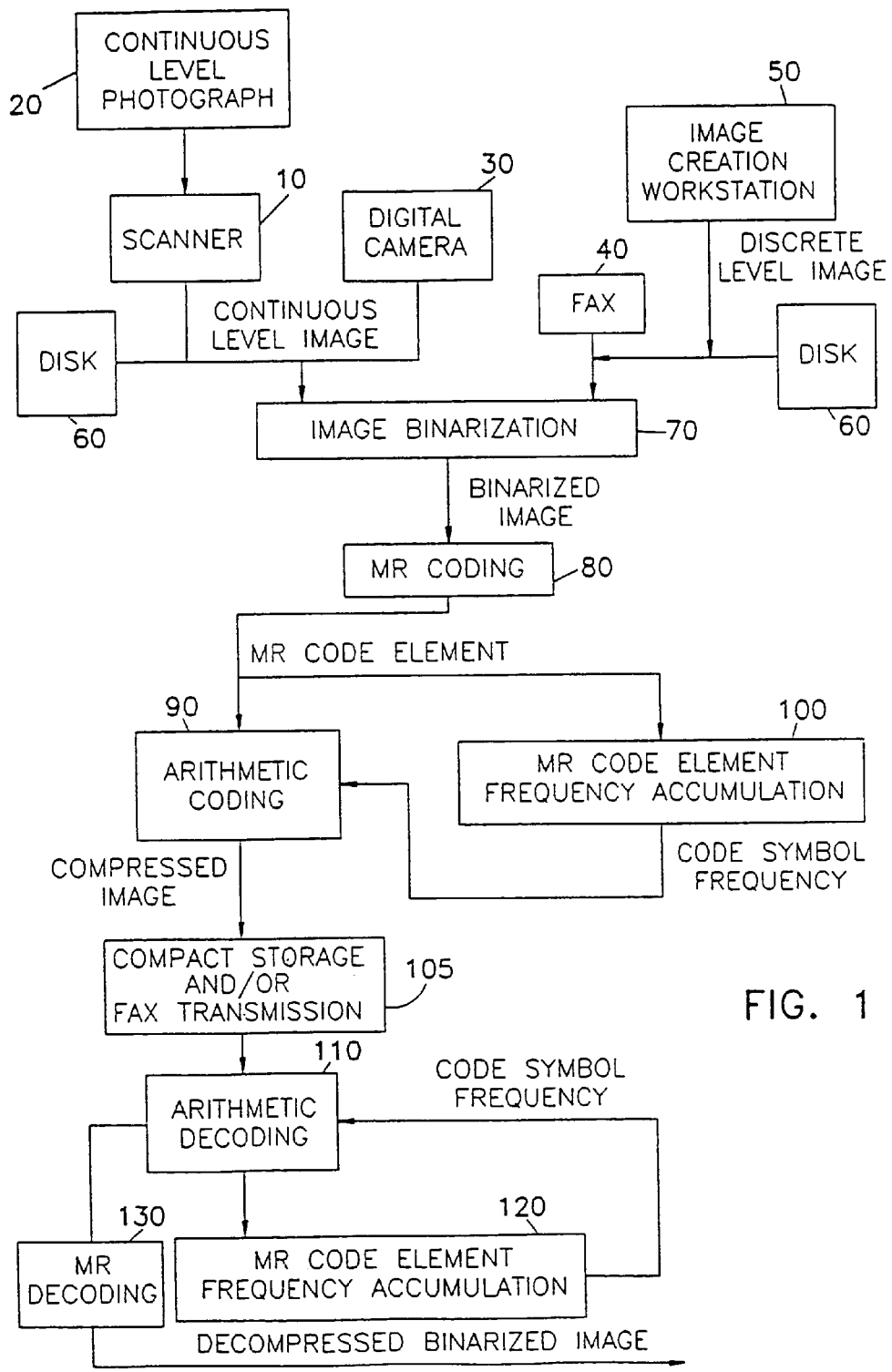
FIG. 1 is a simplified block diagram of an image manipulation system constructed and operative in accordance with a preferred embodiment of the present invention.

Attached herewith are the following appendices which aid in the understanding and appreciation of one preferred embodiment of the invention shown and described herein:

Appendix A is a computer listing of a preferred software embodiment of the MR coding, arithmetic coding and MR code element frequency accumulation units of FIG. 1, and Appendix B is a computer listing of a preferred software embodiment of the arithmetic decoding, MR code frequency accumulation and MR decoding units of FIG. 1.

DETAILED DESCRIPTION OF PREFERRED EMBODIMENTS

Reference is now made to FIG. 1 which is a simplified block diagram of an image manipulation system constructed and operative in accordance with a preferred embodiment of the present invention.

As shown, a digital representation of an image is provided from any suitable source, such as a scanner 10 which scans a substrate such as a continuous level photograph 20, a digital camera 30, a fax machine 40, an image creation workstation 50 such as a Macintosh equipped with the Adobe Photoshop software package, or a storage medium such as a hard disk 60. The digital representation of the image may be either a continuous level image or a discrete level image such as a document or other black and white image.

If the digital representation of the image is not binary, the digital representation is binarized, as indicated in FIG. 1 by image binarization block 70, using any conventional binarizing technique such as those described in Foley J. et al, *Computer Graphics: Principles and practice,* 2nd Ed., Section 13.1.2, pages 568-573.

The binarized image is then coded by MR coding unit 80, using the MR coding scheme described in CCITT Recommendation T.4 and T.6 for Groups 3 or 4.

The MR coded binarized image generated by MR coding unit 80 then undergoes arithmetic coding in arithmetic coding unit 90. The arithmetic coding unit 90 receives as input:

a. the sequence of MR code elements which forms the MR coded binarized image and
b. the estimated probability of each MR code element, which is provided by an MR code element frequency accumulation unit 100. Initially, the estimated probabilities of all MR code elements are typically taken to be equal. However, as the MR code element sequence flows into the MR code element frequency accumulation unit 100, the estimated probabilities change based on the number of times each MR code element is encountered.

The sequence of MR code elements typically includes code elements of 3 types:
a. MR control type code elements;
b. Black run length type code elements; and
c. White run length type code elements.

The frequency accumulation unit 100 typically receives as input each MR code element and, associated therewith, an indication of the type of that MR code element. Typically, unit 100 computes the relative code element frequency for each code element within its own code element type.

The arithmetic coding unit 90 may, if desired, be replaced by an entropy encoder or an adaptive Huffman encoder. If this is the case, then the arithmetic decoding unit 110, described below, is replaced by an entropy decoder or adaptive Huffman decoder, respectively.

One software embodiment of arithmetic coding unit 90 is described in "Arithmetic coding and statistical modeling", Dr. Dobb's Journal, February 1991, pp. 16-29. The above reference also provides a software embodiment of arithmetic decoding unit 110.

Figure 2:
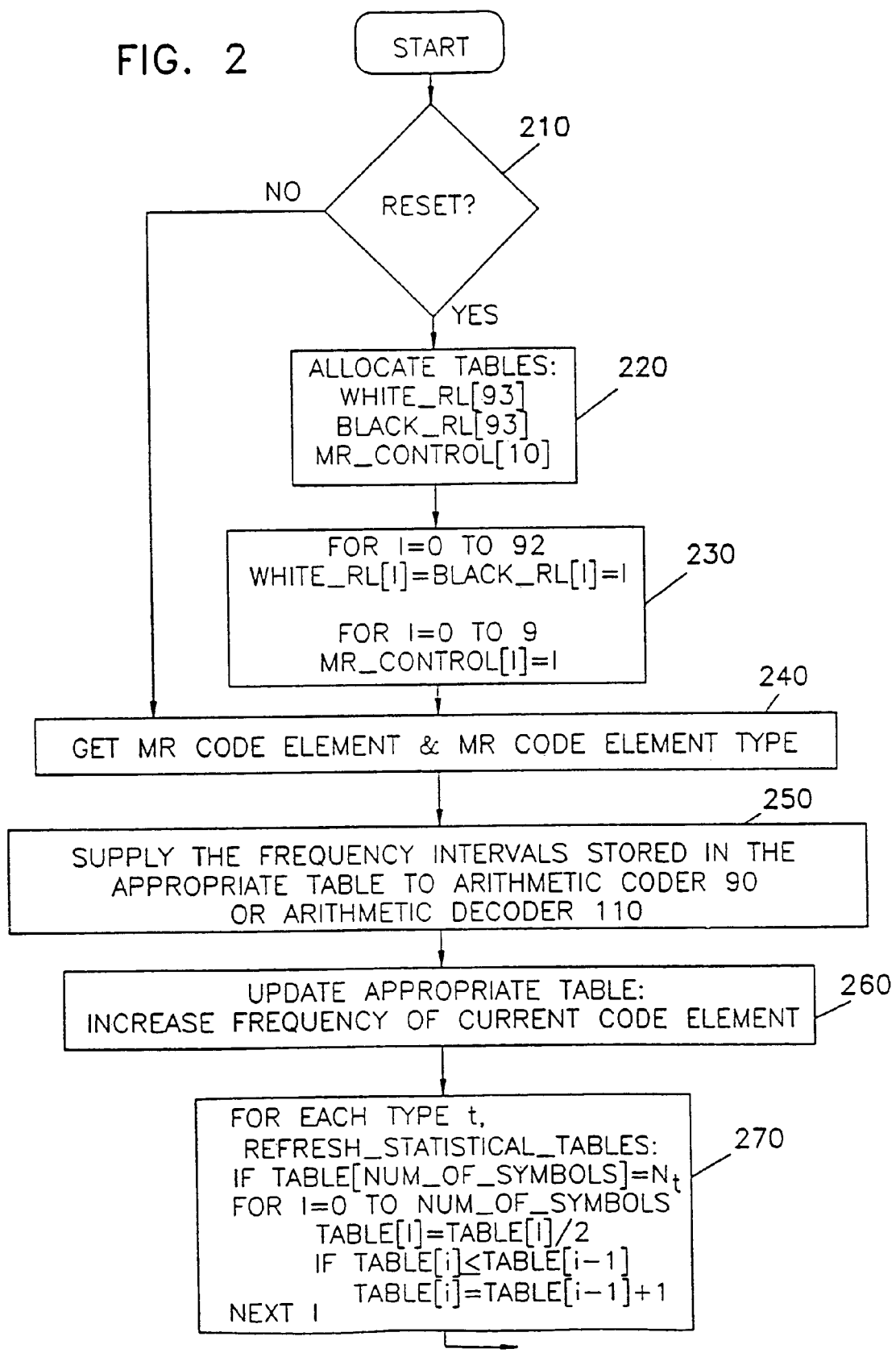
FIG. 2 is a simplified flowchart illustrating a preferred mode of operation in which the MR code element frequency accumulation unit of FIG. 1 processes a single MR code element in a sequence.

An alternative implementation of MR code element frequency accumulation unit 100 is described below with reference to FIG. 2.

The output of the arithmetic coding unit 90 is a very compact representation of the original image which is suitable, for example, for compact storage on any suitable optical or magnetic medium and/or for rapid facsimile transmission, 105, on conventional equipment which preferably has a error correction capability, such as the V32bis modem.

The compact representation of the original image is decompressed after being transmitted or after being retrieved from archival. To decompress the compact representation, the compressed data stream is fed to an arithmetic decoding unit 110 which replaces each arithmetically coded element with a corresponding MR code element according to the frequency of the arithmetically coded element. The frequency information is provided by an MR code element frequency accumulation unit 120 which is typically identical to unit 100. Initially, the estimated probabilities of all MR code elements are typically taken to be equal. However, as the MR code element sequence flows into the MR code element frequency accumulation unit 120, the estimated probabilities change based on the number of times each MR code element is encountered.

The output of the arithmetic decoding unit 110 is a sequence of MR code elements which is decoded by an MR decoding unit 130 using the MR decoding scheme described in CCITT Recommendation T.4 and T.6 for Groups 3 or 4.

The output of MR decoding unit 130 is a decompressed binarized image which is substantially identical to the binarized image generated by image binarization unit 70. FIG. 2 is a simplified flowchart illustrating a preferred mode of operation in which either of the MR code element frequency accumulation units 100 or 120 of FIG. 1 processes a single MR code element in a sequence of MR code elements.

If (process 210) there is a decision to reset, i.e. to begin accumulating frequencies from zero, then the method advances to stage 220. Otherwise, the method advances to stage 240. A reset is performed, for example, if a new image is to be processed whose characteristics are thought to differ significantly from the previous image processed.

In process 220, a table is allocated for each of the three MR code element types. The number of cells in each table typically exceeds the number of code elements of each type, by 1. The difference between the content of the i'th cell in the table and the (i+1)th cell in the table, also termed herein "the i'th interval", is indicative of the relative frequency of the i'th code element, within its code element type.

Since there are 92 code elements of the White Run Length type and of the Black Run Length type, the tables for these two types each typically have 93 cells. Since there are 9 code elements of the MR Control type, the table for the MR Control type typically has 10 cells.

PROCESS 230: The table contents are initialized by generating equal intervals such as, typically, intervals having a length of 1.

PROCESS 240: Input is received: A single MR code element from the MR code element sequence representing the image, and, associated therewith, its MR code element type, is received as input.

PROCESS 250: Unit 100 allows arithmetic coder 90 to arithmetically code the current MR code element, by supplying the frequency intervals stored in the table corresponding to the current MR code element to the arithmetic coder 90. For example, if the MR code element is of the MR_control type, the intervals stored in the MR_control table are employed.

Unit 120 allows the decoder 110 to arithmetically decode the current MR code element, by supplying the same information to decoder 110.

PROCESS 260: The appropriate table is updated by incrementing by 1 the contents of each cell starting from the cell following the cell corresponding to the current code element.

For example, if the fourth MR_control type code element is encountered, the contents of the fifth to ninth cells of the MR-control table are incremented by 1.

Preferably, old frequency information is given less weight than new frequency information. One implementation of this rule is:

PROCESS 270: For each type t, each time $N_t$ code elements of type t have been processed, divide the cell contents of the frequency interval table of type t, by a suitable number such as 2. Suitable $N_t$ values are: 256 for MR control type, 2048 for black and white run length types.

Appendix A is a computer listing in C language, of a preferred software embodiment of the MR coding, arithmetic coding and MR code element frequency accumulation units of FIG. 1.

Appendix B is a computer listing in C language, of a preferred software embodiment of the arithmetic decoding, MR code element frequency accumulation and MR decoding units of FIG. 1.

The programs listed in Appendices A and B may be run on a conventional computer such as any UNIX computer.

It is appreciated that the MR coding described hereinabove may, alternatively be replaced by MMR coding or other similar coding schemes.

It is appreciated that the invention shown and described herein is suitable for compressing and decompressing any type of binarized image, such as binarized discrete level images or binarized continuous level images, also termed herein "halftone images".

In certain applications, it may be desirable to use the compression methods shown and described herein to compress only a portion of a binarized image. For example, in medical imaging applications, the compression methods shown and described herein may be employed to generally losslessly compress the foreground of the medical image whereas the background of the medical image may be compressed using lossy techniques.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

The invention claimed is:

1. A method for compressing binarized images comprising: receiving a binarized image and generating a first sequence of first code symbols representing the binarized image wherein at least one row of the image is represented in run-length encoded format; and encoding a portion of the first sequence of code symbols using a preliminary encoding scheme, thereby to provide a first portion of a second sequence of code symbols, and, while encoding, accumulating the frequency of at least some of the first code symbols thus far encoded and generating an additional portion of the second sequence using a modified version of the code scheme such that at least one subsequent code symbol in the first sequence with a large accumulated frequency is encoded more compactly in the second portion than at least one subsequent code symbol in the first sequence with a small accumulated frequency, wherein the encoding is carried out using electronic circuitry hardcoded to effect the encoding and/or the encoding is carried out using a digital computer executing computer readable code which configures the digital computer to effect the encoding.

2. A method according to claim 1 wherein a modified Huffman coding scheme is employed to generate the first sequence of first code symbols.

3. A method according to claim 1 wherein the encoding scheme used to encode the first sequence of code symbols is continually modified such that code symbols in the first sequence with a large accumulated frequency are encoded more compactly in the second portion than subsequent code symbols in the first sequence with a small accumulated frequency.

4. A method according to claim 1 wherein a modified-read coding scheme is employed to generate the first sequence of first code symbols.

5. A method according to claim 1 wherein a modified modified-read coding scheme is employed to generate the first sequence of first code symbols.

6. A method according to claim 1 and also comprising binarizing a discrete level image, thereby to provide the binarized image.

7. A method according to claim 1 and also comprising binarizing a continuous level image, thereby to provide the binarized image.

8. A method according to claim 1 wherein arithmetic coding is employed to translate the accumulated frequency of at least some of the first code symbols into second code symbols.

9. The method of claim 1 wherein the binarized image is derived from an image of a scene generated by a digital camera, and the binarized image represents the imaged scene.

10. The method of claim 1 wherein the binarized image is derived from an image of a marked-up sheet of paper generated by a scanner or a fax machine, and the binarized image represents markings on the marked-up sheet of paper.

11. The method of claim 1 wherein the binarized image is a medical image of a one or more human body parts or portions thereof.

12. The method of claim 1 wherein the method further comprises the step of transmitting the encoded first portion of code symbols via a switching network.

13. The method of claim 12 wherein the switching network is a circuit-switched network.

14. The method of claim 1 wherein the encoding is carried out using electronic circuitry hardcoded to effect the encoding.

15. The method of claim 1 wherein the encoding is carried out using a digital computer executing computer readable code which configures the digital computer to effect the encoding.

16. A method for compressing binarized images comprising: receiving a binarized image and generating a first sequence of first code symbols representing the binarized image comprising a representation of one row of the binarized image and a representation of differences between at least one subsequent row and at least one previous row; and encoding a portion of the first sequence of code symbols using a preliminary encoding scheme, thereby to provide a first portion of a second sequence of code symbols, and, while encoding, accumulating the frequency of at least some of the first code symbols thus far encoded and generating an additional portion of the second sequence using a modified version of the code scheme such that at least one subsequent code symbol in the first sequence with a large accumulated frequency is encoded more compactly in the second portion than at least one subsequent code symbol in the first sequence with a small accumulated frequency, wherein the encoding is carried out using electronic circuitry hardcoded to effect the encoding and/or the encoding is carried out using a digital computer executing computer readable code which configures the digital computer to effect the encoding.

17. The method of claim 16 wherein the binarized image is derived from an image of a scene generated by a digital camera, and the binarized image represents the imaged scene.

18. The method of claim 16 wherein the binarized image is derived from an image of a marked-up sheet of paper generated by a scanner or a fax machine, and the binarized image represents markings on the marked-up sheet of paper.

19. The method of claim 16 wherein the binarized image is a medical image of a one or more human body parts or portions thereof.

20. The method of claim 16 wherein the method further comprises the step of transmitting the encoded first portion of code symbols via a switching network.

21. The method of claim 18 wherein the switching network is a circuit-switched network.

22. Apparatus for compressing binarized images comprising: a run-length encoder operative to receive a binarized image and to generate a first sequence of first code symbols representing the binarized image wherein at least one row of the image is represented in run-length encoded format; and an adaptive encoder operative to encode a portion of the first sequence of code symbols using a preliminary encoding scheme, thereby to provide a first portion of a second sequence of code symbols, and, while encoding, to accumulate the frequency of at least some of the first code symbols thus far encoded and to generate an additional portion of the second sequence using a modified version of the code scheme such that at least one subsequent code symbol in the first sequence with a large accumulated frequency is encoded more compactly in the second portion than at least one subsequent code symbol in the first sequence with a small accumulated frequency wherein the adaptive encoder includes at least one of:
  A) electronic circuitry hardcoded to effect the encoding and
  B) a digital computer executing computer readable code which configures the digital computer to effect the encoding.

23. Apparatus for compressing binarized images comprising: a binarized image compressor operative to receive a binarized image and to generate a first sequence of first code symbols representing the binarized image, the first sequence comprising a representation of one row of the binarized image and a representation of differences between at least one subsequent row and at least one previous row; and an adaptive encoder operative to encode a portion of the first sequence of code symbols using a preliminary encoding scheme, thereby to provide a first portion of a second sequence of code symbols, and, while encoding, to accumulate the frequency of at least some of the first code symbols thus far encoded and to generate an additional portion of the second sequence using a modified version of the code scheme such that at least one subsequent code symbol in the first sequence with a large accumulated frequency is encoded more compactly in the second portion than at least one subsequent code symbol in the first sequence with a small accumulated frequency wherein the adaptive encoder includes at least one of:
  A) electronic circuitry hardcoded to effect the encoding and
  B) a digital computer executing computer readable code which configures the digital computer to effect the encoding.

24. Apparatus according to claim 22 wherein the binarized image compressor employs a modified-read coding scheme to generate the first sequence of first code symbols.

25. Apparatus according to claim 22 wherein the binarized image compressor employs a modified modified-read coding scheme to generate the first sequence of first code symbols.

26. Apparatus according to claim 22 wherein the adaptive encoder employs arithmetic coding to translate the accumulated frequency of at least some of the first code symbols into second code symbols.

27. Apparatus according to claim 22 wherein the encoding scheme used to encode the first sequence of code symbols is continually modified such that code symbols in the first sequence with a large accumulated frequency are encoded more compactly in the second portion than subsequent code symbols in the first sequence with a small accumulated frequency.

28. The apparatus of claim 22 further comprising a transmitter for transmitting the encoded first portion of code symbols via a switching network.

29. The apparatus of claim 23 further comprising a transmitter for transmitting the encoded first portion of code symbols via a switching network.

* * * * *